US012463476B2

(12) United States Patent
Jeung

(10) Patent No.: US 12,463,476 B2
(45) Date of Patent: Nov. 4, 2025

(54) RECIPROCATING SWITCHED RELUCTANCE MOTOR-DRIVEN ENGINE

(71) Applicant: SN INNOVATION CO., LTD., Daejeon (KR)

(72) Inventor: Young Chun Jeung, Daejeon (KR)

( * ) Notice: Subject to any disclaimer, the term of this patent is extended or adjusted under 35 U.S.C. 154(b) by 254 days.

(21) Appl. No.: 18/282,993

(22) PCT Filed: Mar. 30, 2021

(86) PCT No.: PCT/KR2021/000682
§ 371 (c)(1),
(2) Date: Sep. 19, 2023

(87) PCT Pub. No.: WO2022/211137
PCT Pub. Date: Oct. 6, 2022

(65) Prior Publication Data
US 2024/0322622 A1    Sep. 26, 2024

(51) Int. Cl.
*H02K 1/24* (2006.01)
*H02K 3/18* (2006.01)
*H02K 3/47* (2006.01)

(52) U.S. Cl.
CPC ............ *H02K 1/246* (2013.01); *H02K 3/18* (2013.01); *H02K 3/47* (2013.01)

(58) Field of Classification Search
CPC ............ H02K 1/246; H02K 3/18; H02K 3/47; H02K 1/14; H02K 1/34; H02K 11/21; H02K 33/16; H02K 7/075; H02P 25/032
See application file for complete search history.

(56) References Cited

U.S. PATENT DOCUMENTS 11,121,663 B2 * 9/2021 Jeung ................ F04D 25/06

FOREIGN PATENT DOCUMENTS

| JP | 08065997 A | 3/1996 |
| JP | 2007-318896 A | 12/2007 |
| KR | 10-0186143 | 7/1997 |

(Continued)

OTHER PUBLICATIONS

KR-2010087537-A, all pages (Year: 2010).*

(Continued)

*Primary Examiner* — Naishadh N Desai
(74) *Attorney, Agent, or Firm* — ANTONIO HA & U.S. PATENT, LLC

(57) ABSTRACT

The present invention relates to a reciprocating switched reluctance motor-driven engine in which a crank shaft is rotated by the switched reluctance motor and which is configured to reciprocate according to the reluctance torque generation principle of the switched reluctance motor. More specifically, an SRM module (1) is composed of: a cylindrical stator (11) obtained by coupling two stator cores (111) which have, on the inner surfaces, stator salient poles (1111) that are excited by winding coils (112); and a mover (12) which has mover salient poles (1211) formed on the outer surface and can reciprocate inside the stator (11). The mover (12) is coupled to a crank mechanism (2) for converting the reciprocating motion of the mover (12) into rotational motion, and rotational force is output from the crank mechanism (2) by the mover (12) which is reciprocated by alternatingly exciting the two stator cores (111).

14 Claims, 15 Drawing Sheets

(56) References Cited

FOREIGN PATENT DOCUMENTS

| | | | |
|---|---|---|---|
| KR | 10-2004-0091360 | | 10/2004 |
| KR | 10-2007-0113730 | | 11/2007 |
| KR | 10-0964539 | | 6/2010 |
| KR | 10-2010-0087537 | | 8/2010 |
| KR | 2010087537 A | * | 8/2010 |
| KR | 10-2014-0020697 | | 2/2014 |
| KR | 10-2016-0060996 | | 5/2016 |
| KR | 10-1741006 | | 5/2017 |
| KR | 10-2018-0091461 | | 8/2018 |
| KR | 10-1916814 | | 11/2018 |

OTHER PUBLICATIONS

English Specification of 10-2010-0087537.
English Specification of 10-2018-0091461.
English Specification of 10-0186143.
English Specification of 10-2004-0091360.
English Specification of 10-2016-0060996.
English Specification of JP2007-318896A.
English Specification of 10-1916814.
English Specification of 10-1741006.
English Specification of 10-2014-0020697.
English Specification of 10-2007-0113730.
English Specification of 10-0964539.
English Specification of JP08065997A.

* cited by examiner

RECIPROCATING SWITCHED RELUCTANCE MOTOR-DRIVEN ENGINE

TECHNICAL FIELD

The present invention relates to a reciprocating switched reluctance motor-driven engine that rotates a crankshaft with a switched reluctance motor configured to reciprocate according to the principle of reluctance torque generation of the switched reluctance motor.

BACKGROUND ART

The switched reluctance motor (SRM: Switched Reluctance Motor) installs winding coils only on the salient poles of the stator and the salient poles formed on the stator and rotor, respectively, thereby having many advantages, including simple electromagnetic and mechanical composition, excellent durability, and lower production costs.

These switched reluctance motors are classified into radial air gap motor, axial air gap motor, and transverse flux motor depending on the air gap and flux path between the stator salient poles and the rotor salient poles, which face each other in the radial direction and are arranged in the circumferential direction, and regardless of which type they are classified into, they are the same in that they use the principle of attracting the rotor salient poles to a position that minimizes reluctance with the rotor salient poles when the stator salient poles are excited by the winding coil. That is, the switched reluctance motor is configured to rotate the rotor by sequentially exciting the stator salient poles arranged in the circumferential direction and intermittently and repeatedly attracting the rotor salient poles.

Further, it can increase output by having a structure having a plurality of salient poles that simultaneously generate reluctance torque, a multi-phase structure continuously generating reluctance torque, or a structure combining a plurality of stators to a single rotor as shown in Patent No. 10-1916814 and Patent No. 10-1741006 of the applicant of the present invention.

However, in order to obtain high output, regardless of the structure, the number of turns of the winding coil must be increased or the coil must be thick to flow a large current, so a large, occupied space for the winding coil must be secured accordingly. In the end, the diameter of the stator and rotor has no choice but to be increased, which leads to an increase in volume, lowering the occupancy rate of the winding coil, thereby bringing with it problems such as lowering the occupancy rate of the winding coil, lowering mechanical strength, increasing magnetic loss, and difficulty to improve cooling efficiency due to the nature of the closed space.

In particular, since the engine of an electric vehicle consists of a high-output electric motor, it is necessary to solve the accompanying problems when using a switched reluctance motor.

Further, electric motors with different outputs must be reconfigured by modifying the entire structure, which leads to problems with design and manufacturing costs, as well as limitations in installation space.

Prior Art Literature

Patent Document (Patent Document 1) KR 10-1916814 B1 (2018.11.02)
(Patent Document 2) KR 10-1741006 B1 (2017.05.23)

DISCLOSURE

Technical Problem

Therefore, the purpose of the present invention is to provide a reciprocating switched reluctance motor-driven engine that can obtain high output and solve various problems caused by the structure of the cylindrical stator and rotor while using the principle of generating reluctance torque.

Technical Solution

In order to address the above issue, the present invention provides a reciprocating switched reluctance motor-driven engine comprising an SRM module 1 including a cylindrical stator 11 configured to combine two stator cores 111 of which a stator salient pole 1111 excited by a winding coil 112 formed on an inner surface, which are arranged at intervals according to thickness of the winding coil 112 along a central axis direction of the stator core 111, and a piston-shaped mover 12 configured to have a mover salient pole 1211 formed on an outer surface thereof to face the stator salient pole 1111 with an air gap in between and reciprocate along the direction of the central axis of the stator 11 by the force attracted to the excited stator salient pole 1111 when the stator salient pole 1111 of the two stator cores 111 are alternately excited by passing through the stator 11, a crank mechanism 2 comprising a crank shaft 21 with a crank arm 211 and a connecting rod 22 configured to connect between the mover 12 and the crank arm 211 to convert the reciprocating movement of the mover 12 into the rotational movement of the crank shaft 21, an encoder 3 configured to detect a rotation angle of the crank shaft 21, and a controller 4 configured to control the timing for alternately exciting the stator salient poles 1111 of the two stator cores 111 according to the rotation angle detected by the encoder 3.

According to an embodiment of the present invention, the mover salient pole 1211 is expanded to have a surface 1211*b* facing the winding coil 112 with an air gap through which magnetic flux passes.

According to an embodiment of the present invention, the mover salient pole 1211 is formed to extend in the reciprocating direction longer than the reciprocating movement direction length of the stator salient pole 1111.

According to an embodiment of the present invention, the reciprocating movement direction length of the stator salient pole 1111 is a length between both ends of the reciprocating direction of the winding coil 112.

According to an embodiment of the present invention, the mover salient pole 1211 is formed to extend in the reciprocating direction longer than the reciprocating direction length of the stator salient pole 1111 while being formed expanded in the width direction to have a surface 1211*b* facing the winding coil 112 with an air gap through which magnetic flux passes.

According to an embodiment of the present invention, each of the stator cores 111 has an inner surface of a polygonal cross-section, and a slot is formed on each inner surface, leaving the stator salient pole 1111 at the center thereof so that the bobbin 1121 wound around the winding coil 112 is configured to extrapolate to the stator salient pole 1111.

According to an embodiment of the present invention, the reciprocating movement of the mover 12 is guided by guide rails 113 fixed to the inner corners of the two stator cores 111.

According to an embodiment of the present invention, the crank arm 211 reaches top dead center when the mover salient pole 1211 is centered on the stator salient pole 1111 of one of the stator cores 111 and reaches bottom dead center when the mover salient pole 1211 is centered on the stator salient pole 1111 of the other of the stator cores 111.

According to an embodiment of the present invention, two encoders 3 are provided in one-to-one correspondence with the stator cores 111 and comprises a sensor disk 31 having a shutter part 311 with a rotation angle of the crankshaft 21 corresponding to the range of movement of the mover salient pole 1211 such that the stator salient pole 1111 can exert an attractive force to reduce its reluctance with the mover salient pole 1211 and a sensor 32 detecting the rotation angle at which an attractive force can be applied by sensing the shutter part 311 of the sensor disk 31 rotating by the crankshaft 21, and the controller 4 excites the stator salient pole 1111 to cause the mover 12 to reciprocate while the two encoder 3 corresponding to the two stator cores 111 senses the shutter part 311.

The angle of the shutter part 311 of the sensor disk 31 is set to the rotation range of the crankshaft 21 corresponding to the length of the reciprocating movement direction of the stator salient pole 1111, and the controller 4 is capable of rotating the crankshaft 21 forward and backward by exchanging the two encoders 3 used to determine the excitation timing of the two stator salient poles 1111.

According to an embodiment of the present invention, the crank shaft 21 has a plurality of crank arms 211 each rotatably connected to the connecting rod 22 oriented in different radial directions, and a plurality of SRM modules 1 are provided, each connected one-to-one to the crank arm by a connecting rod.

According to an embodiment of the present invention, there are two crank arms 211 facing radial directions with a 90° angle difference among the plurality of crank arms 211.

According to an embodiment of the present invention, there are crank arms 211 facing radial directions with angular differences of 90° and 180°, respectively, relative to one of the plurality of crank arms 211.

According to an embodiment of the present invention, there are crank arms 211 facing radial directions with angular differences of 90°, 180° and 270°, respectively, relative to one of the plurality of crank arms 211.

Advantageous Effects

Unlike a rotary switched reluctance motor in which the stator salient poles and rotor salient poles are arranged in the circumferential direction, the present invention configured as described above enables a mover with salient poles to reciprocate within a stator in which stator salient poles are arranged in two-stage on a straight line, alternately excites the two-stage stator salient poles to cause reciprocating movement according to the principle of generating reluctance torque, and converts reciprocating movement into rotational motion to output the rotational motion, so that it is configured as a multi-pole two-phase motor, it can be miniaturized, and the occupancy rate of the winding coil that excites the stator salient poles can be increased, resulting in high output.

According to an embodiment of the present invention, the mover salient poles are expanded in the width direction so that the magnetic flux leaking from the winding coil contributes to the rotational force, and they are expanded in the longitudinal direction so that the range of rotation angle in which it is difficult to apply rotational force depending on the thickness between the inner and outer of the winding coil is reduced as much as possible, thereby smoothing rotational movement and increasing efficiency.

According to an embodiment of the present invention, the reciprocating movement of the mover is guided through the edge between the winding coils, so it is easy to install a guide structure for reciprocating movement while maintaining the air gap constant, and to reduce the occupied space.

According to an embodiment of the present invention, an encoder is installed and operated for each stator core to respond flexibly and generate rotational force at the correct timing even if the rotational angular speed changes momentarily.

According to an embodiment of the present invention, it is easy to combine a plurality of SRM modules to obtain high output, and it is easy to install like an internal combustion engine, making it suitable for use as a high output engine.

MODE FOR INVENTION

Hereinafter, embodiments of the present invention will be described with reference to the attached drawings, showing specific and various examples so that those skilled in the art can easily implement the present invention. However, it is clear that the embodiments of the present invention can be implemented through various changes or modifications within the scope of the present invention, and therefore are not limited to the described embodiments. Further, since the embodiments of the present invention can be implemented by those skilled in the art by adding well-known components, circuits, functions, methods, and typical details, it will not be described in detail.

First Embodiment of the Present Invention

Figure 1:
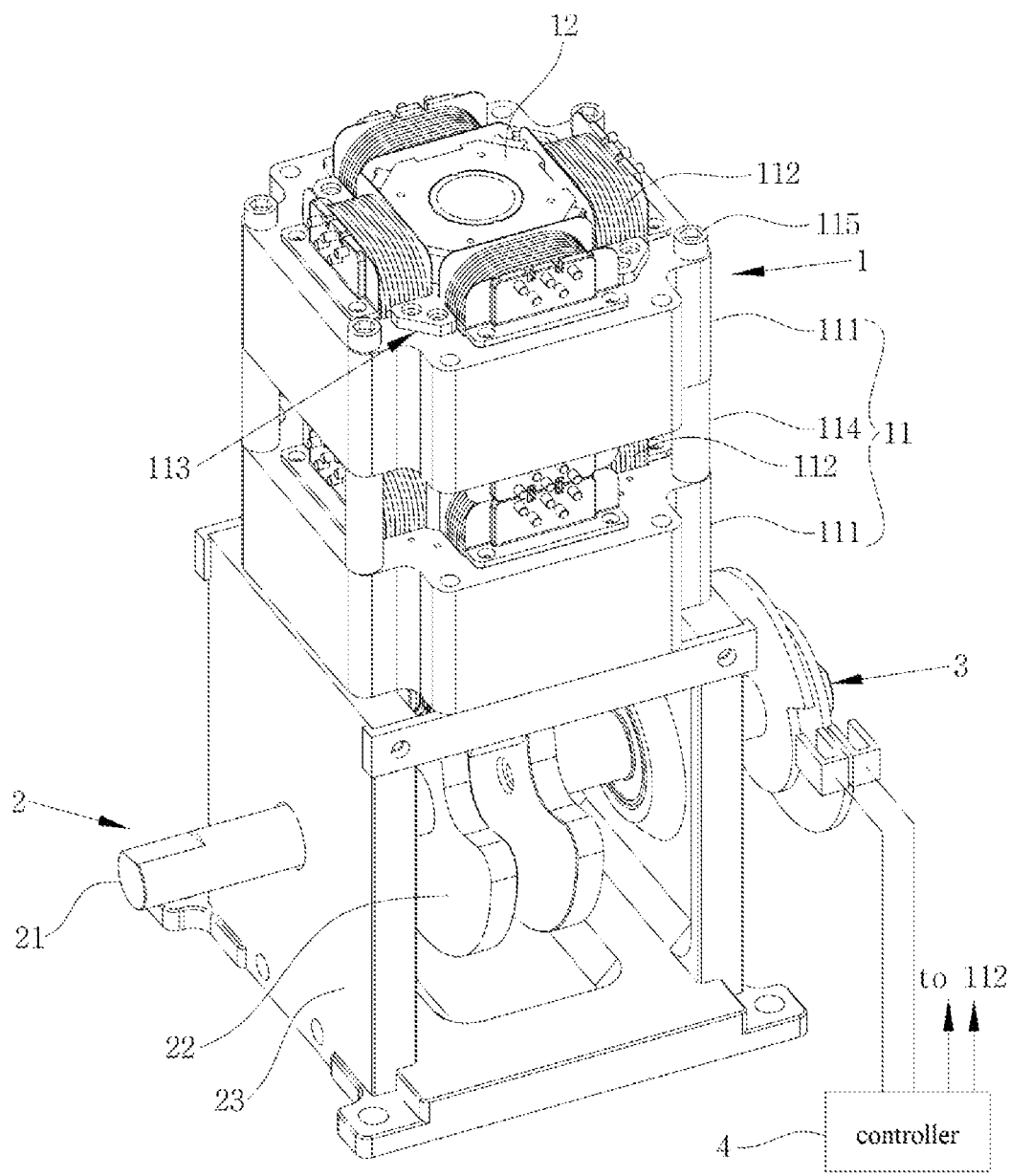
FIG. 1 is a perspective view of a reciprocating switched reluctance motor-driven engine according to the first embodiment of the present invention.
Figure 2:
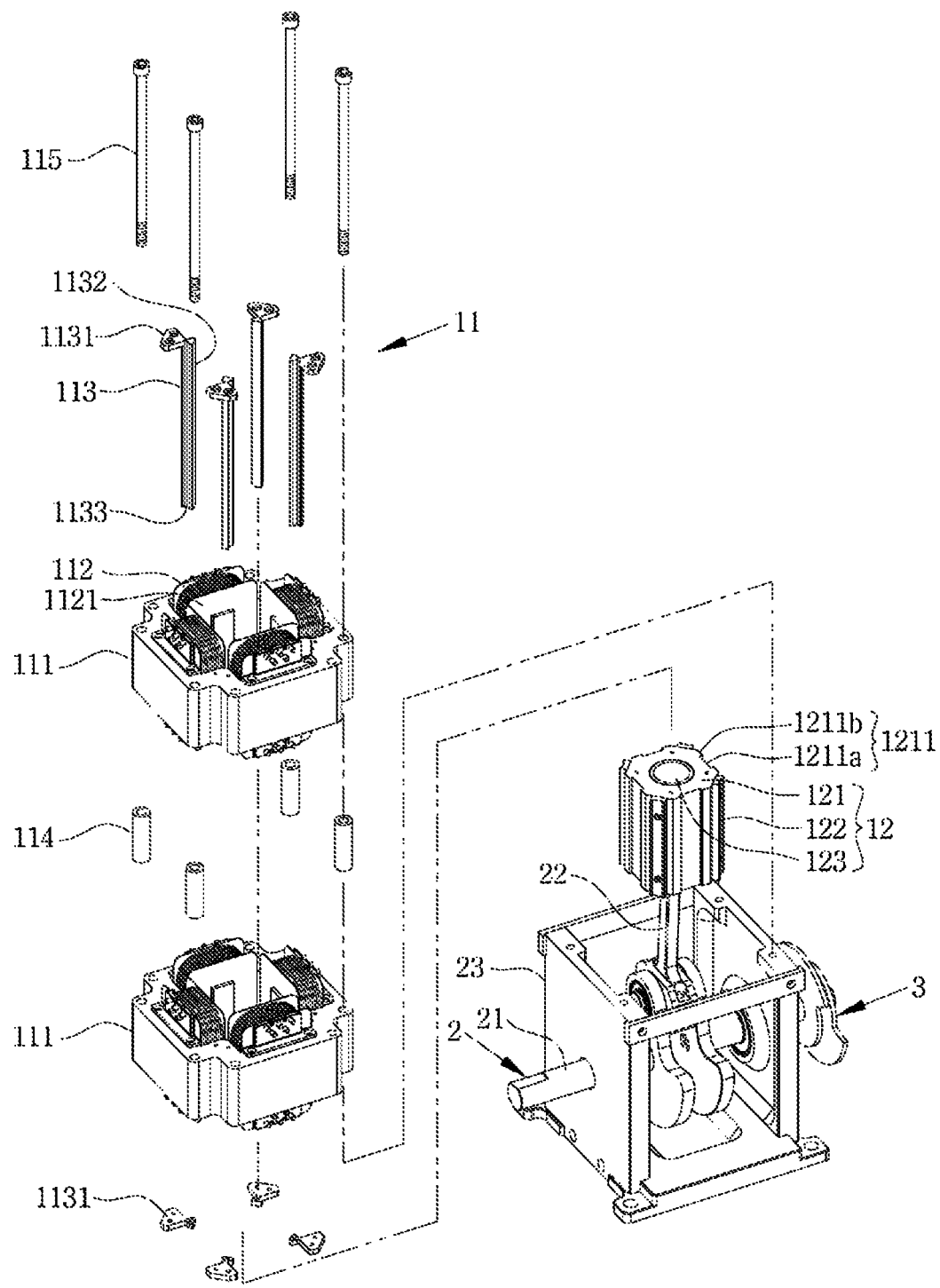
FIG. 2 is a partially exploded perspective view of the SRM module 1 with the stator 11 disassembled.

Referring to the full perspective view shown in FIG. 1 and the partially exploded perspective view of the SRM module 1 shown in FIG. 2, the reciprocating switched reluctance motor-driven engine according to the first embodiment of the present invention includes one SRM (switched reluctance motor) module 1 constructed by combining the stator 11 and the mover 12 so that the piston-shaped mover 12 can reciprocate inside the cylindrical stator 11, the crank mechanism 2 that outputs rotational force by rotating the crankshaft 21 with a connecting rod 22 connected to the mover 12, the encoder 3 that detects the rotation angle of the crankshaft 21, and the controller 4 that controls the excitation timing of the two stator cores 111 according to the rotation angle detected by the encoder 3.

The stator 11 of the SRM module 1 combines two identically configured stator cores 111 to be disposed in the central axis direction of the stator core 111, so that the two stator cores 111 are connected to each other, thereby being composed of a cylinder shape in which the interior of the two interconnected stator cores 111 can be used as a piston movement space for the mover 12.

Figure 3:
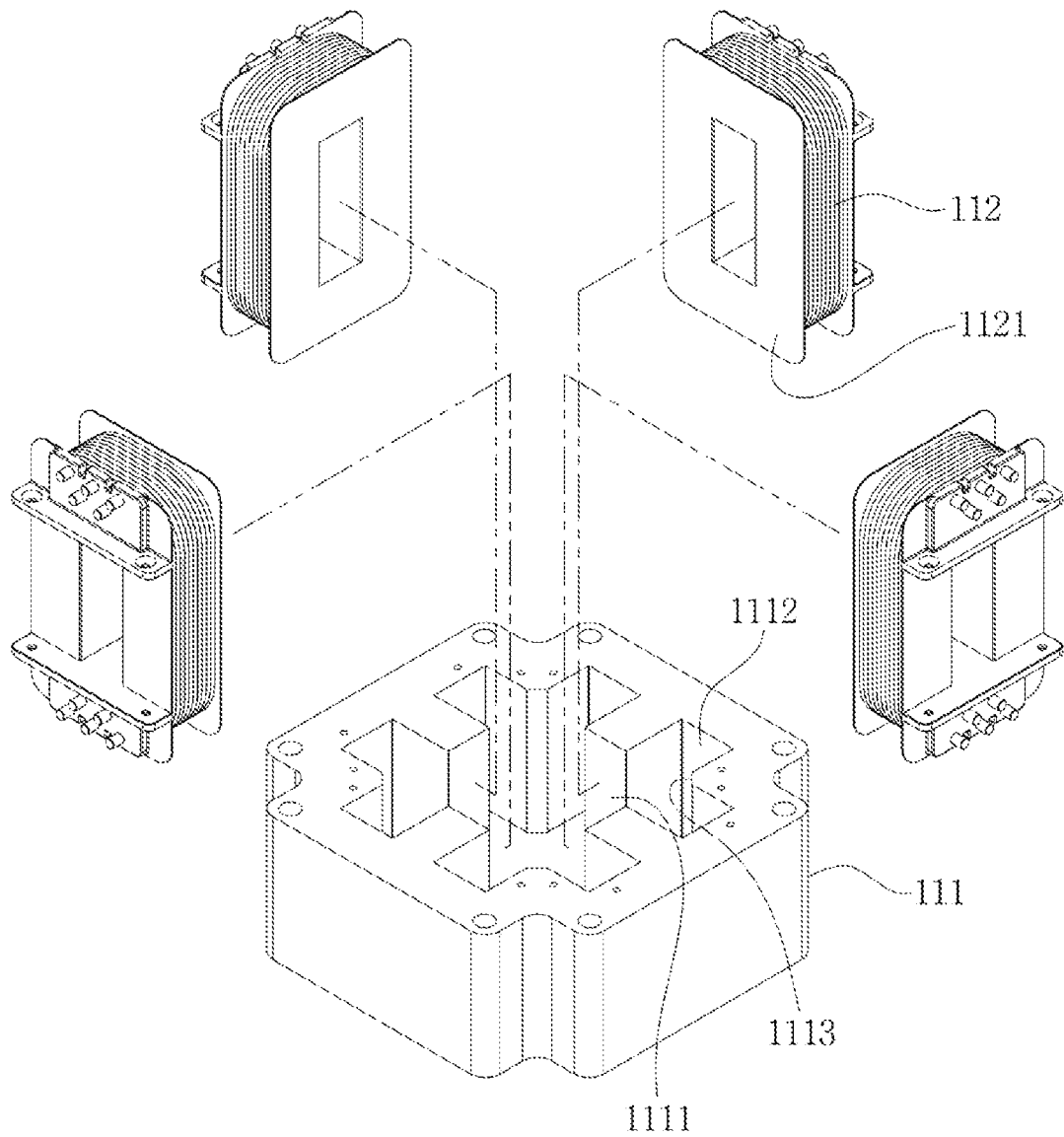
FIG. 3 is an exploded perspective view of the stator core 111 constituting the stator 11.

Referring to the exploded perspective view of FIG. 3, each stator core 111 has an inner surface that forms a polygon when viewed in plan cross-section, and according to a specific embodiment, it has an inner surface having a flat cross-sectional shape of an equiangular polygon (specifically, a square), so that the size of the salient poles to be installed on each side can be made uniform. Further, each inner surface of the stator core 111 is cut on both sides in the central axis direction to form slots 1112 so that the center portion remaining without cutting can be used as the stator salient pole 1111. The bobbin 1121 on which the winding coil 112 is wound is inserted into the slot 1112 and extrapolated to the stator salient pole 1111, so that when voltage is applied to the winding coil 1112 to flow current, the stator salient pole 1111 is excited. That is, stator salient poles 1111 that can be excited by the winding coil 112 are provided on the respective radial sides of the stator core 111 toward the central axis of the stator core 111.

Of course, the winding coil 112 is configured to have a thickness that causes the stator salient poles 111 to slightly protrude toward the central axis. Although not shown in the drawing, a plurality of winding coils 112 mounted on one stator core 111 are electrically connected in series or parallel to apply voltage at the same time and form a magnetic flux passing between circumferentially adjacent stator salient poles 1111, thereby making the magnetic flux path as short as possible. That is, the stator salient pole adjacent to the stator salient pole 1111 magnetized to the N pole can be magnetized to the S pole.

Here, the winding coil 112 is partially inserted into the slot 1112 of the stator core 111 and has a portion exposed in the direction of reciprocating movement, so when two stator cores 111 are combined, the two stator cores 111 must be spaced at least twice the thickness of the exposed portion (thickness between the inner and outer in reciprocating direction).

The winding coils 112 adjacent to each other in the circumferential direction are spaced apart to have a gap sufficient to install the guide rail 113 at each corner 1113 of the inner surface of the stator core 111. Accordingly, the space for mounting the winding coil 112 can be secured as much as possible, thereby increasing the magnetic force caused by the stator salient poles 1111.

In the two stator cores 111 configured in this way, the stator salient poles 1111 are spaced apart from each other along the central axis direction of the stator core 111 at an interval twice the thickness of the central axis direction of the winding coil 112. That is, the inner surface of the cylindrical stator 11 is provided with a plurality of pairs of two stator salient poles 1111 spaced apart in the central axis direction along the circumferential direction.

According to a specific example, the method of combining the two stator cores 111 is as follows: the hollow spacer 114 having a length of at least twice the thickness between the inner and outer of the winding coil 112 is placed on the edge side between the two stator cores 111, and then, the long bolt 115 that penetrates the middle of the spacer 114 and continuously penetrates the edge side of the two stator cores 111 is installed. At this time, the end of the long bolt 115 is bolted to the crank holder 23 below, thereby fixing the stator 11 to the crank holder 23.

Guide rails 113 to guide the reciprocating movement of the mover 12 are mounted on the respective corners 1113 of the inner surfaces of the two combined stator cores 111.

Figure 4:
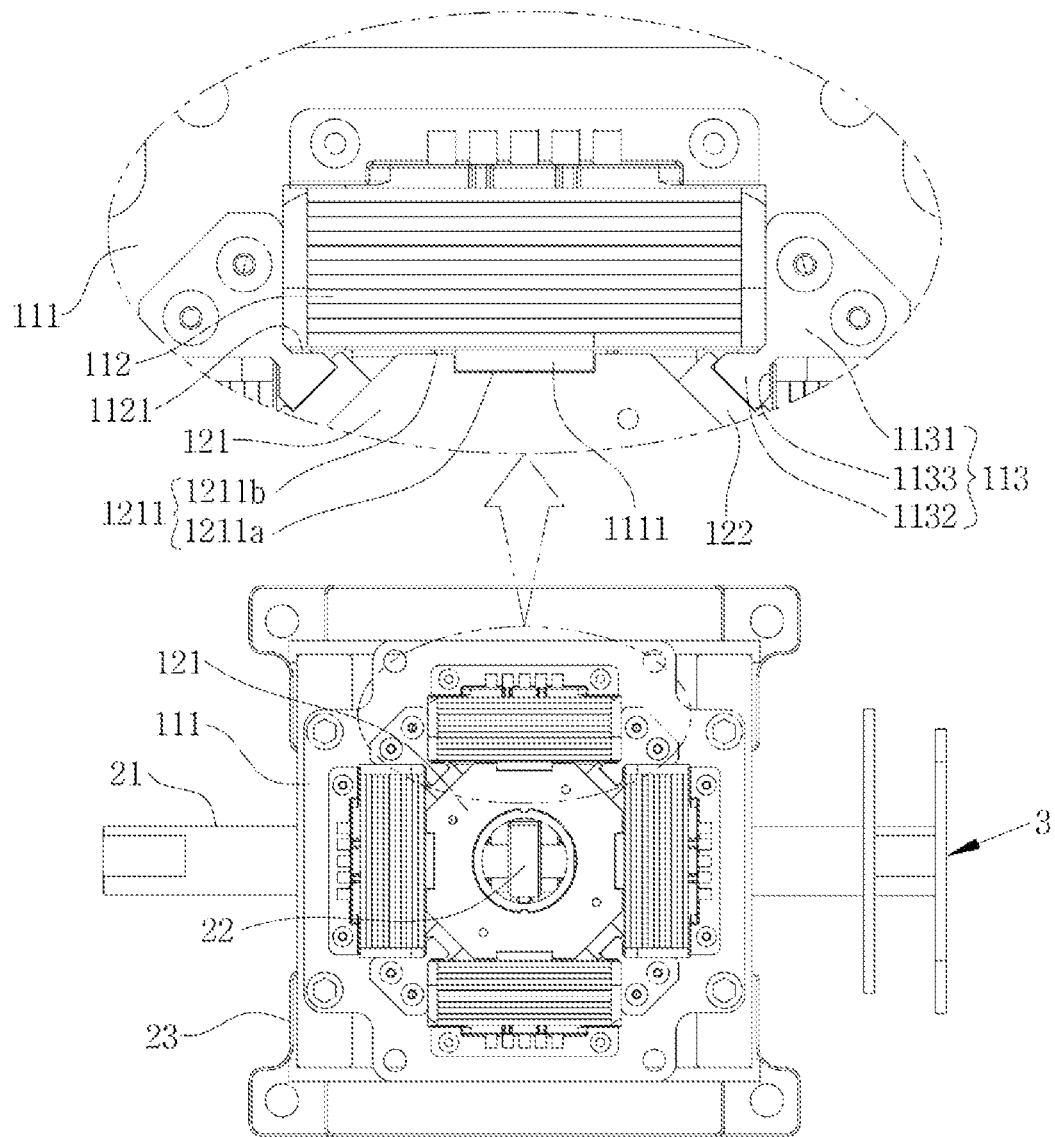
FIG. 4 is a plan view of one SRM module 1 coupled to the crank mechanism 2.

As can be seen in more detail in the plan view of FIG. 4, the guide rail 113 includes the fixing part 1131 to be fixed to the stator core 111, the coil catching part 1131 that is inserted between the winding coils 112 adjacent to the corner 1113 and extends the portion exposed to the inside of the stator core 111 to span the edge side of the winding coil 112 (to be exact, the edge side of the bobbin), and the guide part 1132 that is directed toward the inside of the stator core 111 and guides the mover 12 to reciprocate. Further, the guide rails 113 mounted on the two stator cores 111 are integrated so that those arranged in the reciprocating direction are connected to each other.

The guide rail 113 is installed in this way thereby securing the occupation rate of the winding coil 112 as much as possible, more stably fixing the winding coil 112 the stator core 111, minimizing the space occupied by the guide rail 113, maintaining the gap between the mover 12 and the stator 11 at a constant level, and guiding the reciprocating movement of the mover 12 to minimize increase in volume of the SRM module 1 according to the guide rail 113.

The mover 12 of the SRM module 1 is described with reference to the partially exploded perspective view of FIG. 2, the plan view of FIG. 4, and the partial cross-sectional perspective view of FIG. 5.

The mover 12 penetrates the inside of the cylindrical stator 11 formed by combining two stator cores 111, is configured to fit the size of one stator core 111, and forms the mover salient poles 1211 along the circumferential direction on its outer surface to face one to one the stator salient poles 1111 of the stator core 111 when being placed inside one stator core 111, and the mover 12 includes the mover core 121 whose center is pierced along the direction to be reciprocated, sliding blocks 122 installed one by one on a portion which is toward each corner 1113 of the inner surface of the stator core 111 on the outer surface of the movable core 121, allowing slide along the guide part 1132 of the guide rail 113, and the hollow tube-shaped sleeve 123 that is inserted and fixed inside the mover core 121.

According to the specific embodiment shown in the drawing, the mover core 121 has a tube shape having an outer surface of an equiangular polygon shape so as to penetrate the interior of the equiangular polygon shape of the stator core 111 and has the mover salient pole 1211 to face the stator salient pole 1111 one-to-one with an air gap through which the magnetic flux traverses, and the edges of the outer surface are filleted to ensure space for mounting the sliding block 122.

According to an embodiment of the present invention, the mover salient pole 1211 formed in the mover core 121 is expanded in the width direction (direction perpendicular to the direction of reciprocating movement and crossing between both edges) to have a side facing the winding coil 112 to form a gap through which magnetic flux passes between the mover core 121 and the winding coil 112 so that the magnetic flux leaking from the winding coil 112 contributes to the reciprocating movement and extends longer than the length of the reciprocating movement direction of the mover 12, thereby minimizing the section where force for reciprocating movement cannot be applied as much as possible.

Figure 5:
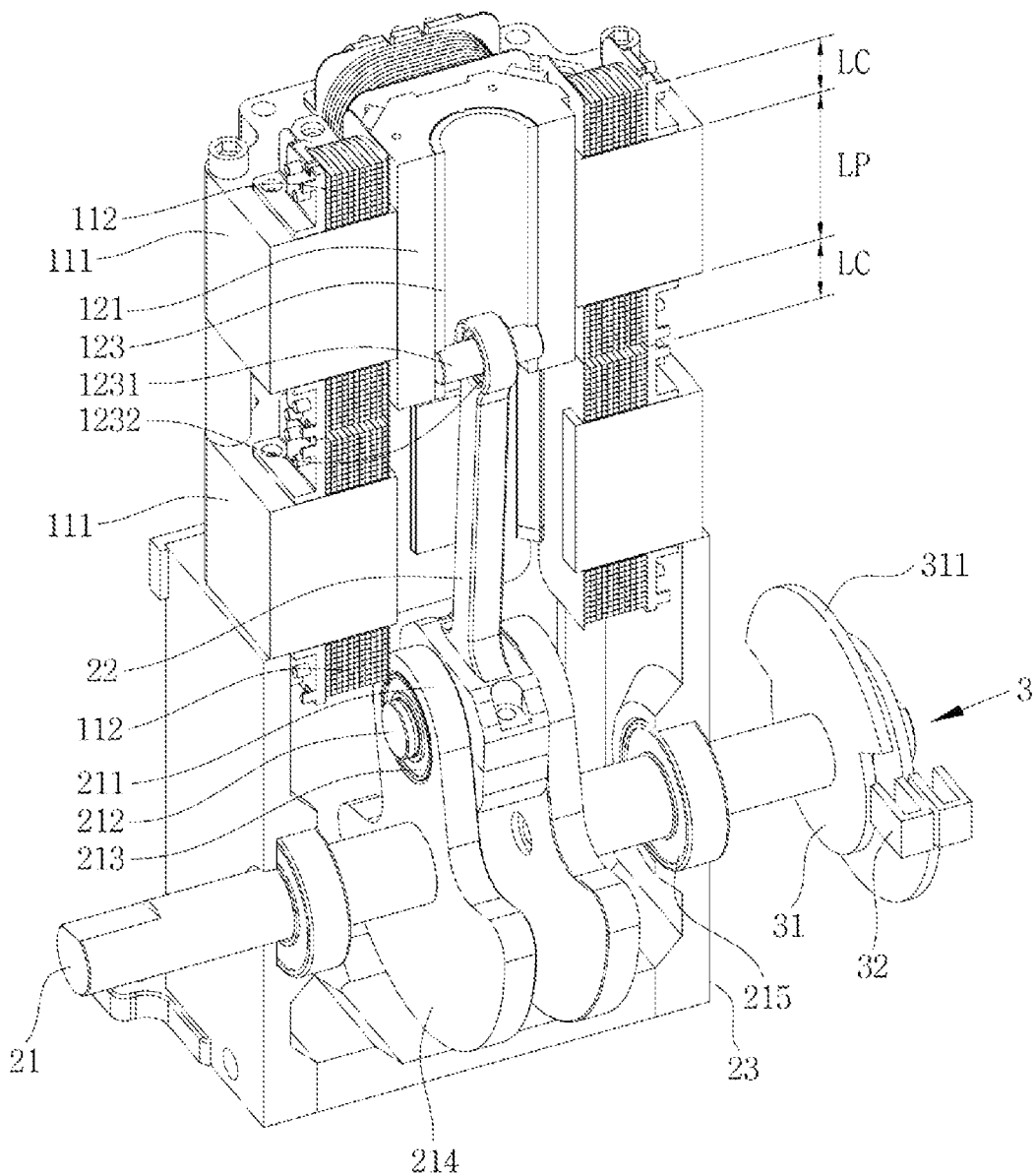
FIG. 5 is a partial cross-sectional perspective view of one SRM module 1 coupled to the crank mechanism 2.

When explained based on the length of the reciprocating movement direction of the mover 12 according to the specific embodiment shown in FIG. 5, the length of the mover core 121 is the sum of the length LP of the stator core 111 and twice the inner and outer thickness LC of the winding coil 112 to have a length between the outer surfaces of the winding coil 112 in the direction of reciprocating movement.

Further, as shown in FIG. 4, the mover salient pole 1211 formed on the outer surface of the mover core 121 has a width relatively larger than the width of the stator salient poles 1111, creates a groove, which is a passage through which the stator salient poles 1111, which protrude slightly more than the winding coil 112, pass in the longitudinal direction (reciprocating direction) while spaced apart by an air gap, thereby including the salient pole opposing surface 1211a that can face the stator salient pole 1111 and the coil opposing surface 1211b that can face the winding coil 112.

The air gap between the salient pole opposing surface 1211a and the stator salient pole 1111 is generally the air gap between the rotor salient pole and the stator salient pole of a rotary switched reluctance motor, on which the magnetic flux is concentrated to pass through, and for example, it can be formed at 0.2 mm intervals. Since the bobbin 1121 on which the winding coil 112 is wound is blocked between the coil opposing surface 1211b and the winding coil 112, the gap between the coil opposing surface 1211b and the winding coil 112 separates the bobbin 1121 from the coil opposing surface 1211b, thereby ensuring the reciprocating movement of the mover 12 and allowing an appropriate gap for the magnetic flux to pass through with maximum concentration.

The mover salient pole 1211 is formed in this way, thereby generating the force to minimize the reluctance (magnetic resistance) that appears between the mover salient pole 1211 and the salient pole opposing surface 1211a, when the stator core 111 is excited by the winding coil 112. The force generated at this time can be applied to minimize the reluctance that appears between the coil opposing surface 1211b and the winding coil 112 at the beginning of attracting the mover salient pole 1211.

Here, the outer edge of the mover core 121 is filleted to install the guide rail 113 and the sliding block 122 as described above to minimize the magnetic flux path between adjacent mover salient poles with an edge therebetween. Accordingly, magnetic loss within the mover core 121 can be minimized.

Meanwhile, the stator core 111 is constructed by laminating ferromagnetic electrical steel plates, and the mover core 121 is constructed by laminating electrical steel plates such as pure iron steel sheet, silicon steel sheet, alloy steel sheet containing pure iron or silicon, amorphous alloy steel sheet, so that eddy current loss in the core is preferably reduced.

The sleeve 123 is provided with the piston pin 1231 that traverses the inside of the crankshaft 21, which is described later, as close as possible, thereby rotatably connecting the small end of the connecting rod 22, which is described later, with the bearing 1232 or bushing.

As described above, the mover 12, which is installed to be able to reciprocate inside the stator 11 combining the two stator cores 111, reciprocates along the central axis direction of the stator 11 by a force that is attracted in a direction that can minimize the reluctance with the excited stator salient poles 1111 when the stator salient poles 1111 of the two stator cores 111 are alternately excited, that is, by the force attracted in the direction that is centered and faces the excited stator salient pole 1111, and at this time, the excitation timing of the stator salient poles 1111 of the two stator cores 111 is appropriately controlled according to the rotation angle of the crankshaft 21 detected by the encoder 3, which is described later, so that the reciprocating movement can be repeated.

The crank mechanism 2 is described with reference to the partial cross-sectional perspective view of FIG. 5.

The crank mechanism 2 includes the crankshaft 21 rotatably supporting the main journal on the crank holder 23 by a bearing 215, so that the rotation axis is perpendicular to the direction of reciprocating movement of the mover 12, and the connecting rod 22 rotatably connecting the small end to the piston pin 1231 of the sleeve 123 of the mover 12 and rotatably connecting the large end to the crank pin 212 of the crank arm 211 using a bearing 213, thereby converting the reciprocating movement of the mover 12 into the rotary motion of the crankshaft 21. Of course, the piston pin 1231 and the crank pin 212 are parallel to the crank shaft 21, and as shown, the crank arm 211 may be formed with the counterweight 214 centered on the rotation axis of the crank shaft 21 at a location opposite to the location where the crank pin 212 is installed.

Here, the mover 12 reaches top dead center when the mover salient pole 1211 is centered on the stator salient pole 1111 of one of the stator cores 111 and is connected to crank mechanism to reach bottom dead center when the mover salient pole 1211 is centered on the stator salient pole 1111 of the other of the stator cores 111. For this purpose, the crank arm 211 is configured in which the distance from the rotation axis of the crank shaft 21 to the crank pin 212 of the crank arm 211 is half the distance between the centers of the stator salient poles arranged along the direction of reciprocating movement among the stator salient poles provided on the two stator cores. The purpose of reaching top dead center and bottom dead center when centered in this way is to maximize the force applied to the mover 12 and minimize the cycle of applying force.

Meanwhile, the crank holder 23 is used to fix the stator 11 by screwing the end of the long bolt 115 described above.

The encoder 3 is fixed to the crank shaft 21 to rotate by the crank shaft 21 and includes the sensor disk 31 having a shutter part 311 protruding in the radial direction and the sensor 32 that detects a rotation angle that can apply an attractive force by detecting the shutter part 311 of the sensor disk 31 rotating by the crankshaft 21, and two of them are installed equal to the number of two stator cores 111 included in the stator 11, so that they correspond one to one with the two stator cores 111. That is, as described later, the signal output from the sensor 32 of the two installed encoders 3 is used to determines the timing for applying voltage to the winding coil 112 of the corresponding stator core 111 in the controller 4. The sensor 32 can be configured to detect the shutter part 311 using a sensor such as an optical sensor, magnetic Hall sensor, or proximity sensor.

Here, the shutter part 311 is formed in a fan shape with a predetermined arc and protrudes in a radial direction centered on the rotation axis of the crankshaft 21, and at this time, the arc angle has the angle of the rotation range of the crankshaft 21 corresponding to the movement range of the mover salient pole 1211, which may apply an attractive force between the stator salient pole 1111 of the corresponding stator core 111 and the mover salient pole 1211 of the mover core 121.

According to the driving principle of the switched reluctance motor, when exciting the stator salient pole 1111, the mover salient pole 1211 is guided so that the center of the mover salient pole 1211 is aligned with the center of the stator salient pole 1111.

That is, because an attractive force is generated in a direction that can reduce the reluctance between the stator salient pole 1111 and the mover salient pole 1211, the arc angle of the shutter part 311 is set according to the reluctance reduction section (or inductance increase section) corresponding to the range of motion of the mover salient pole 1211 from the point when the surface of the mover salient pole 1211 begins to face the stator salient pole 1111 until they are aligned, thereby exciting the stator salient poles 1111 to generate an attractive force. Of course, the mover salient pole 1211 here refers to the salient pole opposing surface 1211a, and the reluctance reduction section (or inductance increase section) refers to the section from the point where the salient pole opposing surface 1211a begins to face the stator salient pole 1111 to the point where the centers of the reciprocating motion directions are aligned.

Accordingly, the two stator cores 111 are excited to have a 180° difference based on the rotation angle to apply rotational force twice during one rotation so that when changing the stator core 111 to be excited, rotational force is not applied in the rotation range corresponding to thickness between the inner and outer LC in the reciprocating direction of the winding coil 112.

Figure 6:
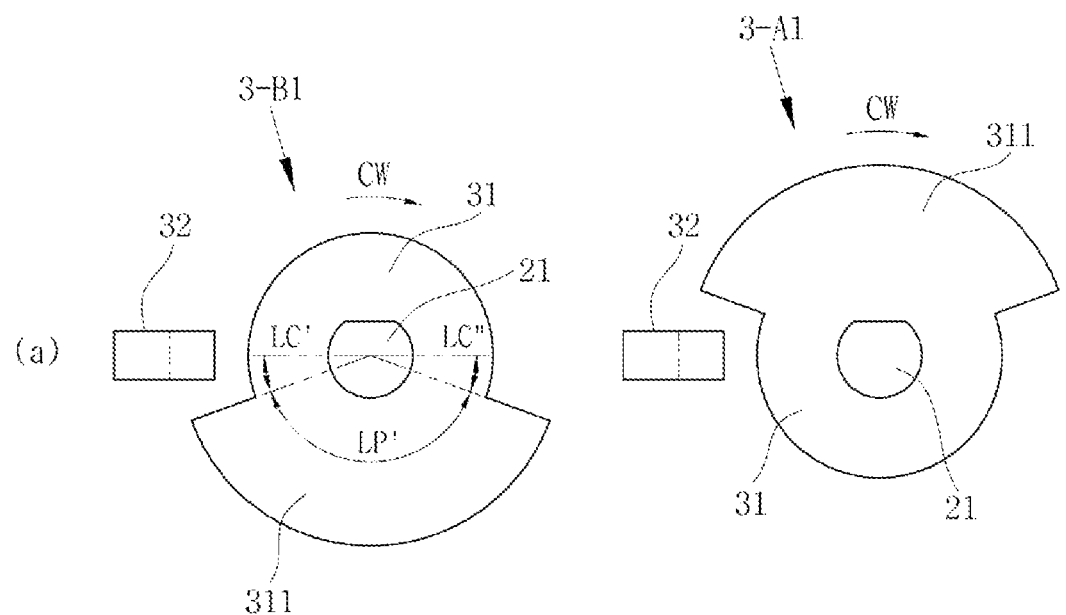
FIG. 6 is (a) a side view showing the axial view of two encoders 3: 3-A1 and 3-B1 and (b) an excitation time chart schematically showing the excitation time the two stator cores 111 provided in one SRM module 1 according to the rotation angle of the crankshaft 21.
Figure 6:
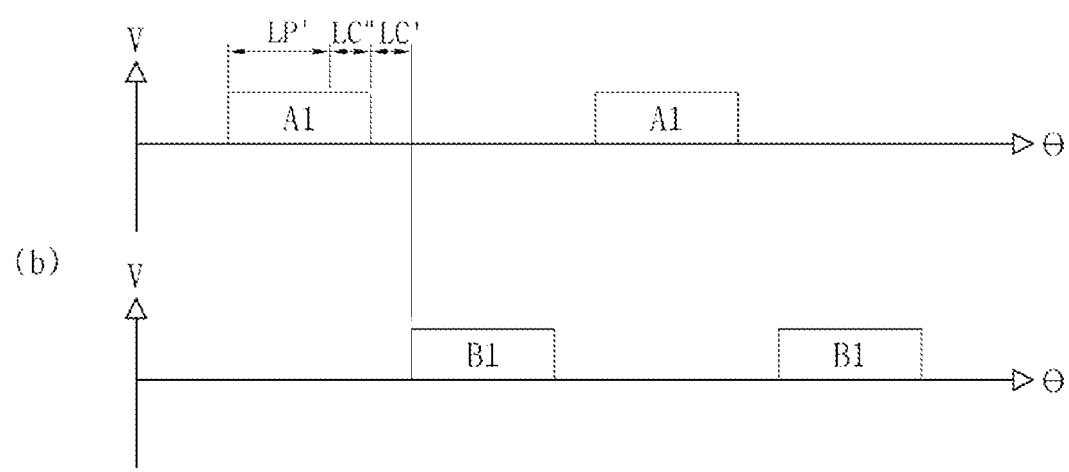

When a specific embodiment is described with reference to FIGS. 5 and 6, in order to rotate the crankshaft 21 forward and backward with the SRM module 1, the arc angle LP' of the shutter part 311 is an angle in the rotational movement range corresponding to the reciprocating movement direction length LP of the stator salient pole 1111.

FIG. 6(a) shows the shape of two encoders 3: 3-A1 and 3-B1 viewed in the axial direction.

Two encoders 3: 3-A1 and 3-B1 includes the first encoder 3-A1 far from the crank mechanism 2 and the second encoder 3-B1 close to the crank mechanism 2. In FIG. 6a, the relative positions of the sensor disks 31 and sensors 32 provided in the first and second encoders 3-A1 and 3-B1, respectively, are shown in line with the position of the mover 12 shown in FIGS. 1 and 5. Further, for symmetry, the two sensor disks 31 are fixed symmetrically around the rotation axis so that the radial directions toward the shutter unit 311 are 180° different, and the two sensors 32 are installed in the same radial direction so that they can detect from the point when the mover salient pole 1211 begins to face the stator salient pole 1111 to the point when it moves by the length of the stator salient pole 1111.

That is, the arc angle LP' of the shutter part 311 has 180° to arc angle of LC'+LC" by the rotation angles LC' and LC" corresponding to thickness between the inner and outer LC in the reciprocating direction of the winding coil 112. At this time, the rotation angle LC' and LC" is divided into a rotation angle LC' corresponding to thickness between the inner and outer LC in adjacent portions of the two winding coils 112 arranged in the reciprocating direction, and a rotation angle LC" corresponding to thickness between the inner and outer LC at the outer part, leading to an angle difference.

Further, the crankshaft 21 can be rotated forward and reverse by using interchangeably the two encoders 3: 3-A1 and 3-B1 used to determine the excitation timing of the two stator salient poles 1111. That is, the encoder 3 used to determine the excitation timing of the stator salient pole 1111 when rotating clockwise CW is replaced when rotating counterclockwise CCW, to be used to determine the excitation timing of the stator salient pole 1111.

FIG. 6(b) is an excitation time chart schematically showing the excitation time of the two stator cores 111 provided in one SRM module 1 according to the rotation angle of the crankshaft 21, and the rotation range LC" until the alignment state is reached after the detection signal of the shutter part 311 is cut off can be estimated according to the rotation speed so that it can be excited until alignment is reached. Accordingly, the excitation section A1 and B1 of each stator core 111 has a rotation range corresponding to the sum of the length of the stator salient pole 1111 and thickness between the inner and outer LC of the winding coil 112, and a time difference occurs as much as the rotation angle LC' corresponding to thickness between the inner and outer of the winding coil 112 between the excitation section A1 and B1.

Here, at the time of exciting the stator salient pole 1111 when the salient pole opposing surface 1211a begins to face the stator salient pole 1111, the coil opposing surface 1211b faces along the length of the reciprocating motion direction of the winding coil 112 so that the magnetic flux coming directly from the winding coil 112 rather than via the stator salient pole 1111 is added to the attractive force to increase the initial attraction force, thereby allowing more smooth driving. Further, even until alignment, the magnetic flux directly coming from the winding coil 112 contributes to the attractive force.

Meanwhile, in switched reluctance motors, for various reasons, they are excited only up to a certain time before the alignment point, and when the opposing area between the salient pole opposing surface 1211a and the stator salient pole 1111 does not increase, the attractive force becomes weak even if the magnetic flux leaking to the winding coil 112 contributes thereto, and therefore, immediately before alignment, it may not be excited or the excitation time may be shortened at the rotation angle LC" corresponding to thickness between the inner and outer LC of the winding coil 112.

Figure 7:
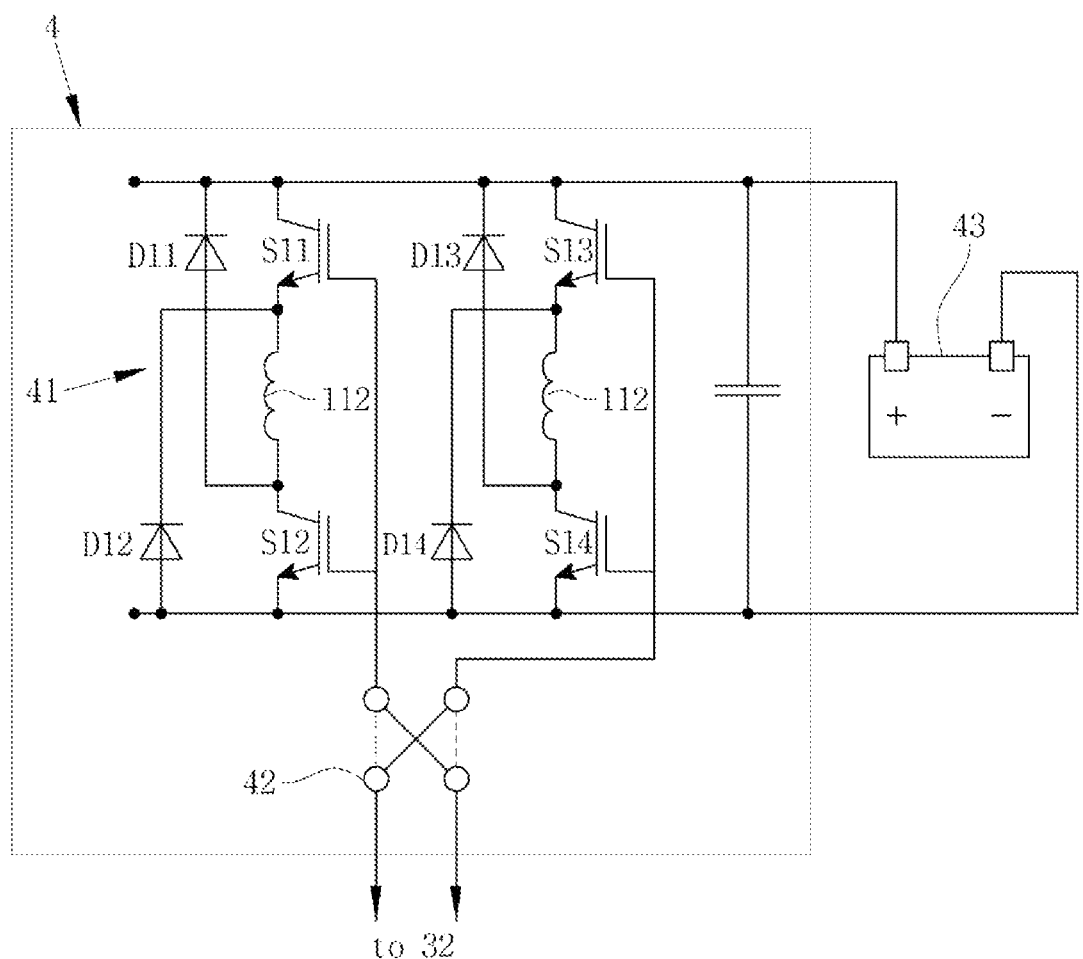
FIG. 7 is a circuit diagram of the controller 4.

FIG. 7 is a circuit diagram of the controller 4 that controls the excitation time of the two stator cores 111 to have the excitation time chart illustrated in FIG. 6*b*. It should be noted that in FIG. 7, two winding coils 112 are shown for convenience to show the positions where the two winding coils 112 are electrically connected. At this time, the winding coils 112 installed for each stator salient pole 1111 in each stator core 111 are connected in series or parallel.

The controller 4 includes the driver circuit part 41 connected to the power unit 43 through a (+) power line and a (−) power line to excite the two stator cores 111 with DC power from the power unit 43 and the changeover switch 42 for forward and reverse control.

The driver circuit part 41 includes the first circuit connecting one of the two winding coils 112 to the (+) power line and the (−) power line through the switching elements S11 and S12 and the second circuit connecting the other one of the two winding coils 112 to the (+) power line and the (−) power line through switching elements S13 and S14, and the capacitor is connected between the (+) power line and the (−) power line on the power unit 43 side. Further, the first and second circuits are each provided with diodes D11, D12, D13, and D14 to fly back the self-induced voltage of the winding coil 112 to the capacitor.

The changeover switch 42 connects the two sensors 32 of the two encoders 3: 3-A1 and 3-B1 one-to-one to the switching elements S11 and S12 of the first circuit and the switching elements S13 and S14 of the second circuit, and it is a switch that allows the to-be-connected switching elements to be exchanged and may be configured as a four-way switch, for example. Of course, the signal output when the shutter unit 311 is detected by the two sensors 32 is processed by, for example, a trigger flip-flop circuit so that the output signal of the trigger flip-flop circuit can turn on the switching elements S11 and S12 of the first circuit and the switching elements S13 and S14 of the second circuit.

The switching switch 42 configured as described above is switch-operated according to the user's operation or control signal, so that the switching elements S11 and S12 of the first circuit and the switching elements S13 and S14 of the second circuit for connection of the two sensors 32 one-to-one are reversed, thereby being operated as an engine that can rotate the crankshaft 21 forward and backward.

On the premise that it has sufficient mechanical strength while using the mover 12 as a magnetic flux path, the reciprocating switched reluctance motor-driven engine according to the first embodiment of the present invention described above can be made as small as possible, make the stator 11 as small as possible while maximizing the occupancy rate of the stator core 112, and essentially consist of a two-phase motor with multipolar salient poles, so that it can be configured as a high-output engine while being compact.

Meanwhile, the reciprocating switched reluctance motor-driven engine according to the first embodiment of the present invention has one SRM module 1, so, for example, when the mover 12 is at top dead center or bottom dead center, it becomes impossible to start, so a separate starter (or initiator) is required.

In the following embodiments of the present invention, it is explained that it is configured to include the crankshaft 21 having a plurality of crank arms 211 each rotatably connected to the connecting rod 22 oriented in different radial directions and SRM modules (1) each connected to the crank arm 211 through a connecting rod, so that starting can be made without a starter (or initiator) and the output can be varied depending on the number of SRM modules 1.

According to a specific embodiment of the present invention for this purpose, in the first embodiment of the present invention, one SRM module 1 and a crank mechanism 2 are combined together form one engine module, and a plurality of engine modules are combined, so that a plurality of SRM modules 1 rotate one crankshaft 21.

Second Embodiment of the Present Invention

Figure 8:
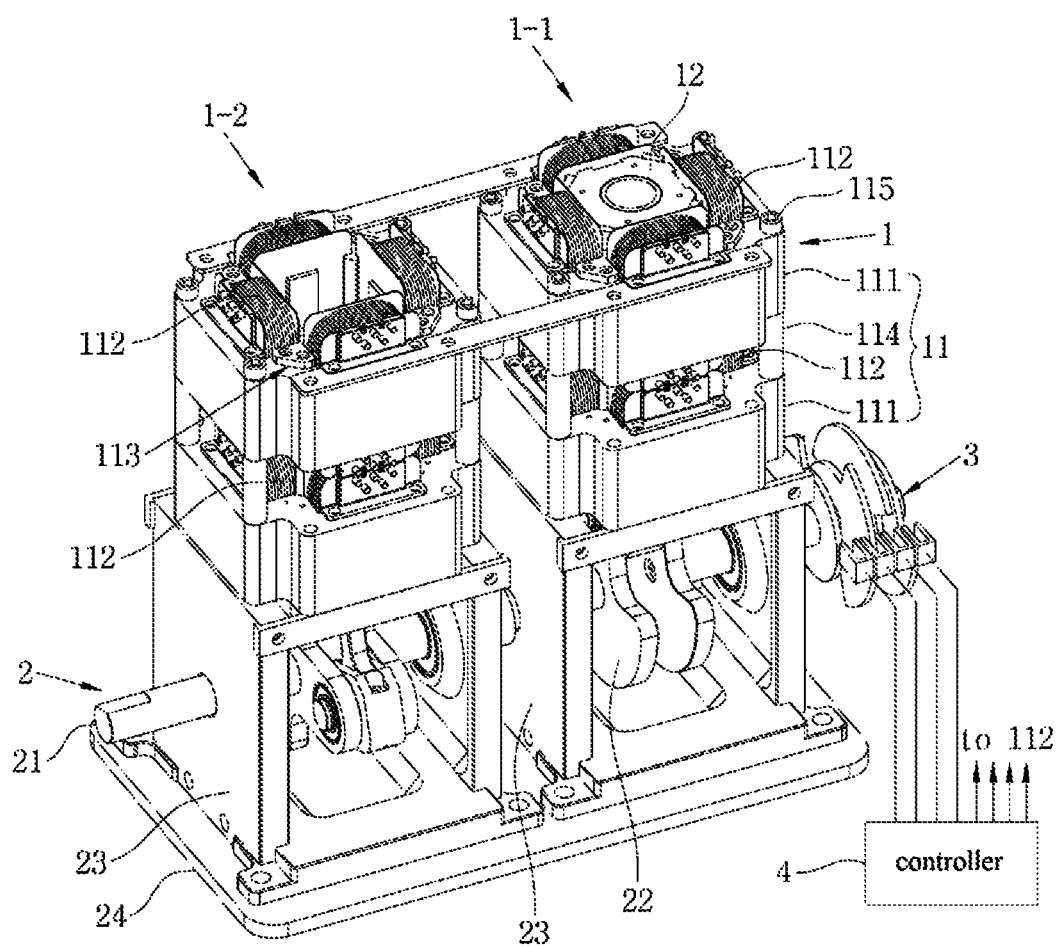
FIG. 8 is a perspective view of a reciprocating switched reluctance motor-driven engine according to the second embodiment of the present invention.

FIG. 8 is a perspective view of a reciprocating switched reluctance motor-driven engine according to the second embodiment of the present invention.

Figure 9:
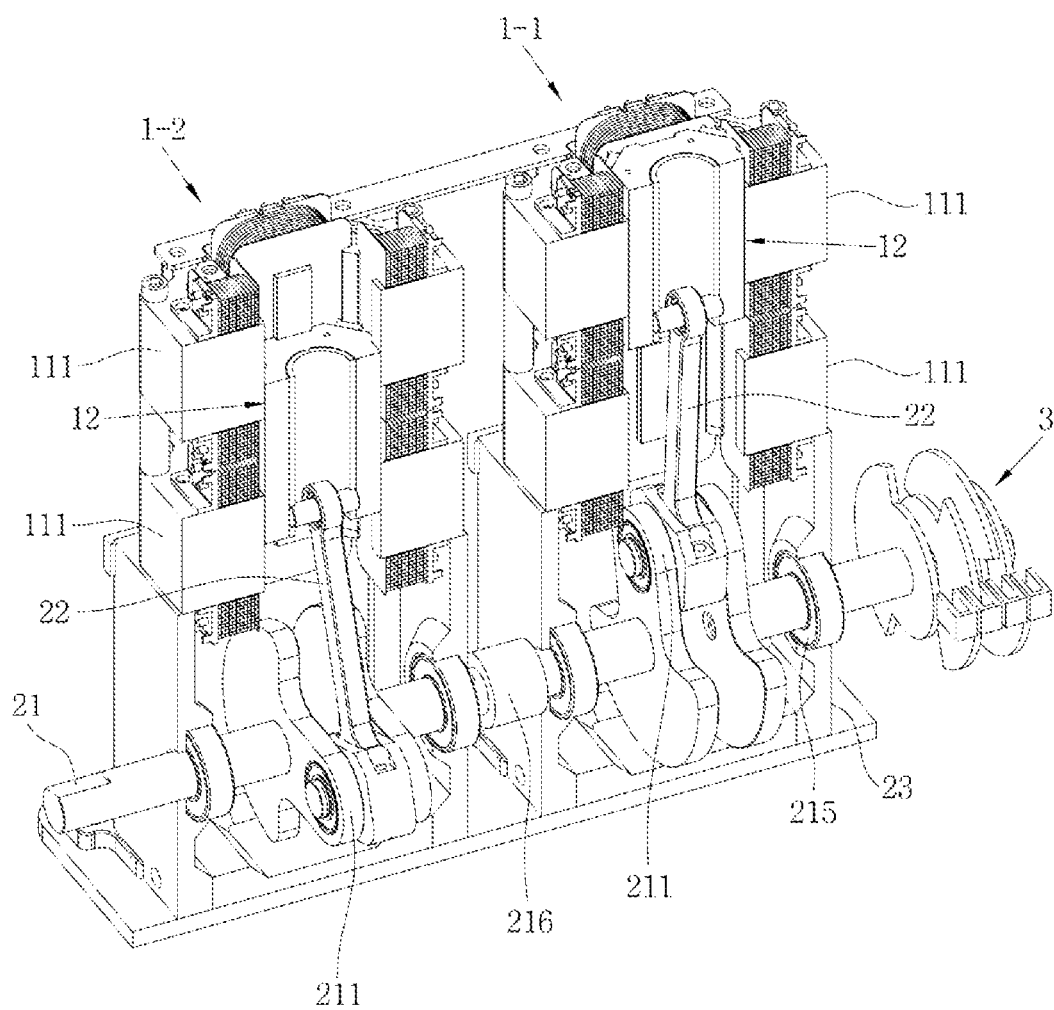
FIG. 9 is a partial cross-sectional perspective view of two SRM modules 1 coupled to the crank mechanism 2.

FIG. 9 is a partial cross-sectional perspective view of two SRM modules 1: 1-1 and 1-2 coupled to the crank mechanism 2.

Figure 10:
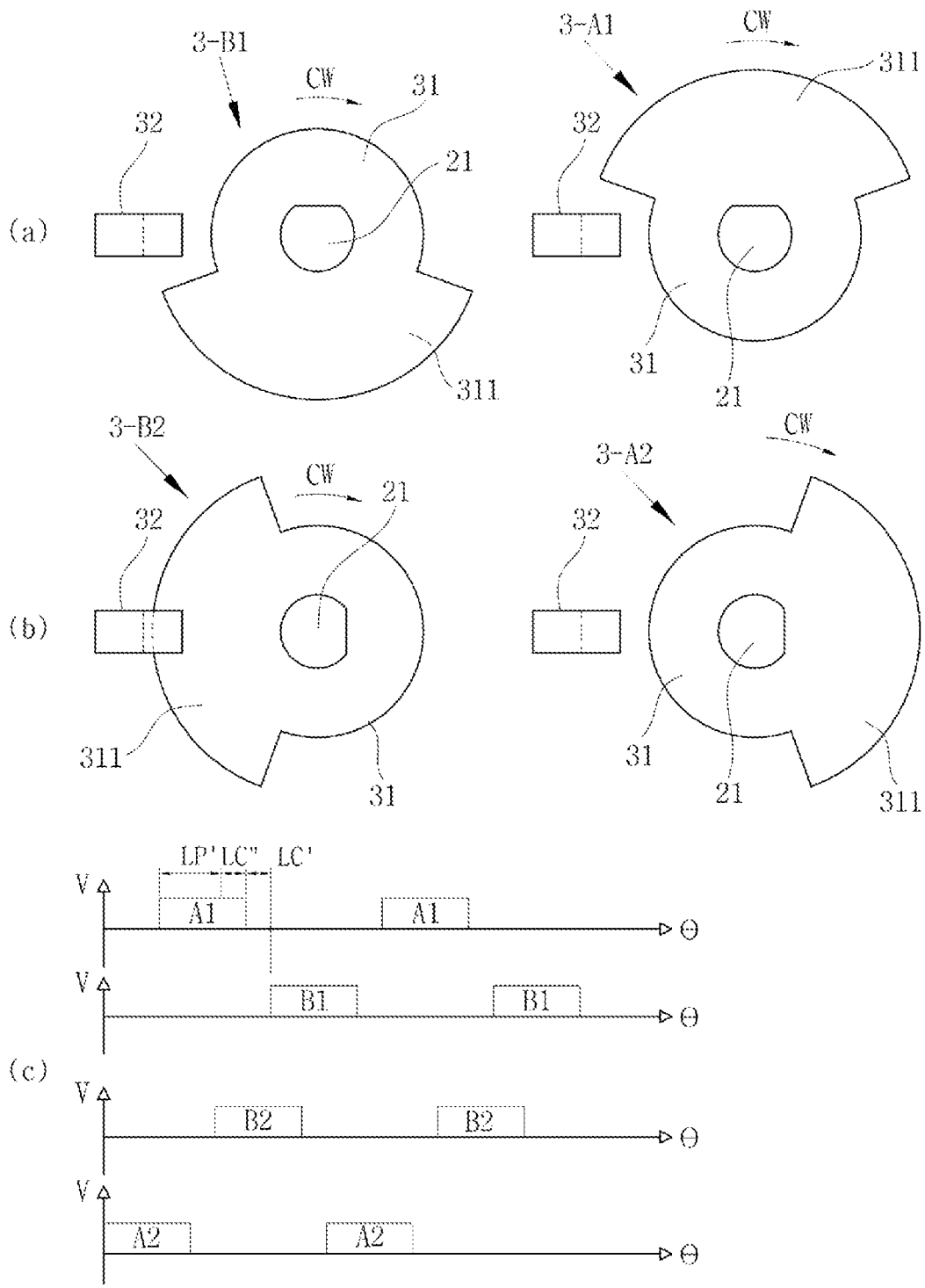
FIG. 10 is (a) a side view showing the axial view of four encoders 3: 3-A1, 3-B1, 3-A2, and 3-B2 and (b) an excitation time chart schematically showing the excitation time of the two stator cores 111 provided in two SRM modules 1 according to the rotation angle of the crankshaft 21.

FIG. 10 is (a) a side view showing the axial view of four encoders 3: 3-A1, 3-B1, 3-A2, and 3-B2 and (b) an excitation time chart schematically showing the excitation time of the two stator cores 111 provided in two SRM modules 1 according to the rotation angle of the crankshaft 21.

Figure 11:
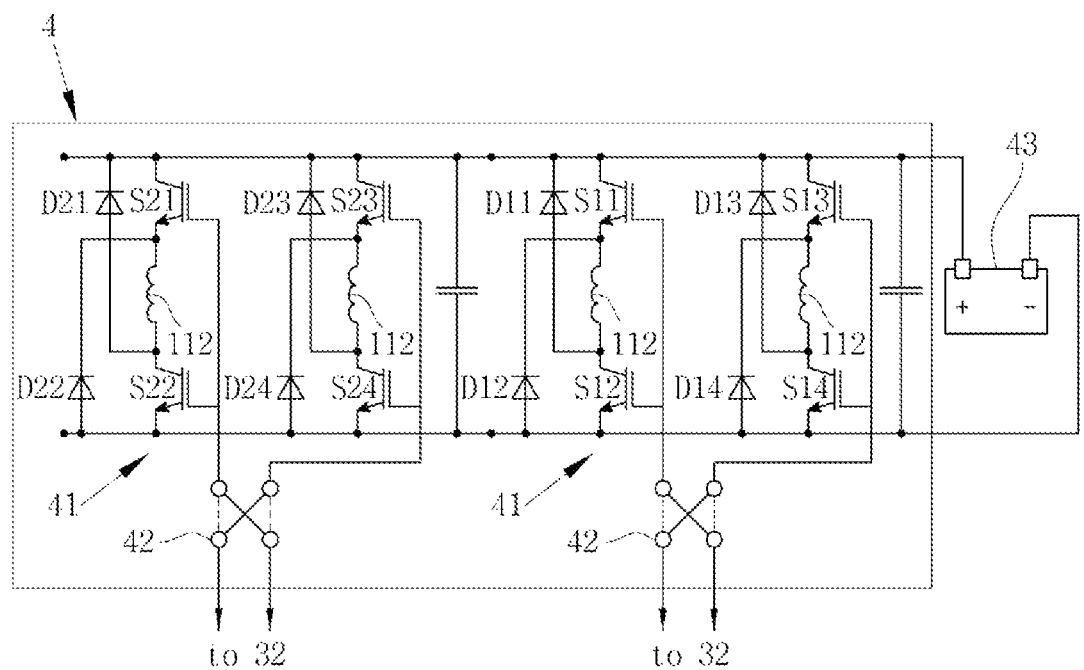
FIG. 11 is a circuit diagram of the controller 4.

FIG. 11 is a circuit diagram of the controller 4.

The reciprocating switched reluctance motor-driven engine according to the second embodiment of the present invention is constructed by combining two engine modules.

That is, with the crank arm 211 provided in one of the two engine modules facing the radial direction with a 90° angle difference, the crankshafts 21 of the two engine modules are integrated by connecting them with the coupling 216, and the two crank holders 23 are fixed to the base plate to rotate the crankshaft 21 with two SRM modules 1: 1-1 and 1-2 integrated. Further, four encoders 3: 3-A1, 3-B1, 3-A2, and 3-B2 are installed on the integrated crankshaft 21 according to the number of two engine modules.

That is, the two crank arms 211 provided on the integrated crankshaft 21 are offset at an angle of 90° from the direction in which the crank pin 212 rotatably connecting the large end of the connecting rod 22 faces.

Further, as shown in FIGS. 10*a* and 10*b*, the direction in which the shutter unit 311 of the sensor disk 31 of the two encoders 3-A1 and 3-B1 installed for one SRM module 1-1 faces and
  the direction in which the shutter unit 311 of the sensor disk 31 of the two encoders 3-A2 and 3-B2 installed for the other SRM module 1-2 faces have a 90° angle difference with respect to the rotation axis, but the sensors 32 are arranged in the same radial direction, so that excitation is performed at a 90° difference corresponding to half the distance between top dead center and bottom dead center according to the excitation time chart shown in FIG. 10*c*.

As shown in FIG. 11, the controller 4 for excitation includes the driver circuit unit 41 and the changeover switch 42 for each SRM module 1-1 and 1-2.

As illustrated in FIG. 9, the engine is configured in this way in which even if the mover 12 in one SRM module 1-1 is at top dead center or bottom dead center, the mover 12 of the other SRM module (1-2) is located in the middle between top dead center and bottom dead center, so that the mover salient pole 1211 and the stator salient pole 1111 are not aligned but are partially facing each other. Accordingly, during forward and reverse rotation, regardless of which direction it rotates, the stator core 111 that matches the direction of rotation can be excited and started (or initiated). Further, two SRM modules 1 are driven to increase output.

Third Embodiment of the Present Invention

Figure 12:
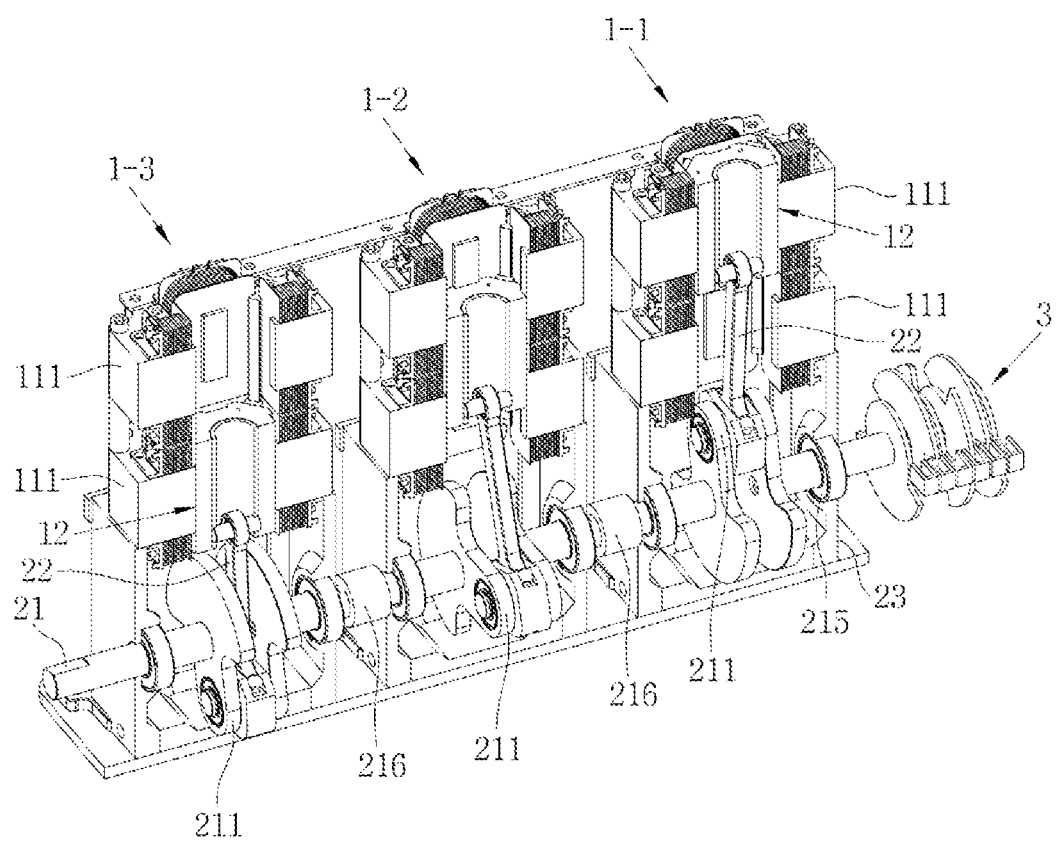
FIG. 12 is a partial cross-sectional perspective view of three SRM modules 1 coupled to the crank mechanism 2 in a reciprocating switched reluctance motor-driven engine according to the third embodiment of the present invention.

FIG. 12 is a partial cross-sectional perspective view of three SRM modules 1 (1-1, 1-2, 1-3) coupled to the crank mechanism 2 in a reciprocating switched reluctance motor-driven engine according to the third embodiment of the present invention.

Figure 13:
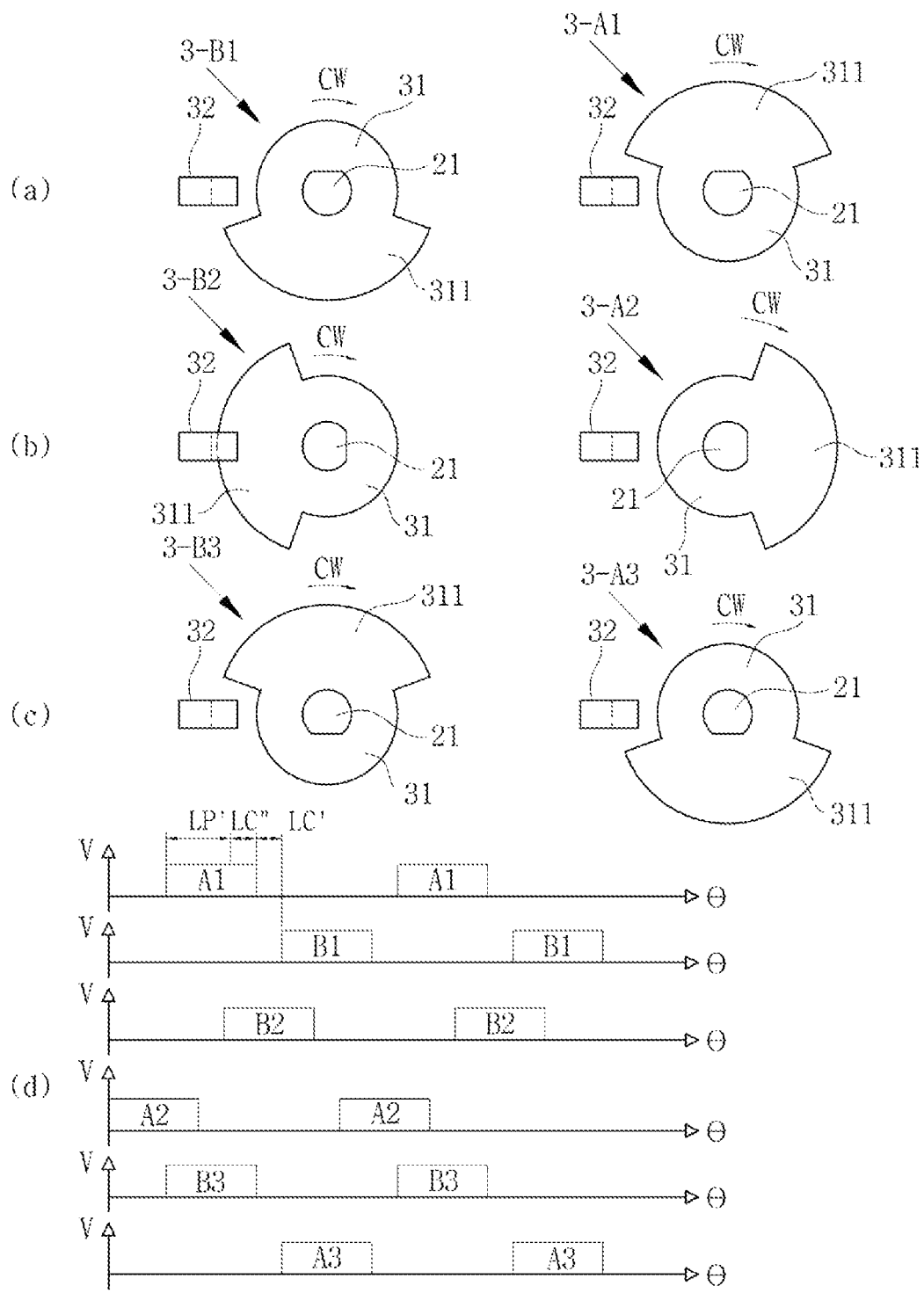
FIG. 13 is (a) a side view showing the axial view of six encoders 3: 3-A1, 3-B1, 3-A2, and 3-B2 and (b) an excitation time chart schematically showing the excitation time of the two stator cores 111 provided in three SRM modules 1 according to the rotation angle of the crankshaft 21.

FIG. 13 is (a) a side view showing the axial view of six encoders 3 (3-A1, 3-B1, 3-A2, 3-B2) and (b) an excitation time chart schematically showing the excitation time of the two stator cores 111 provided in three SRM modules 1 according to the rotation angle of the crankshaft 21.

The reciprocating switched reluctance motor-driven engine according to the third embodiment of the present invention is constructed by combining three engine modules 1 and 2.

Specially, another engine module 1 and 2 in which the direction of the crank arm (211) is 90° different and still another engine module 1 and 2 in which the direction of the crank arm (211) is 180° different based on one engine module 1 and 2 are sequentially arranged in a line, the crankshafts 21 of the respective engine modules are sequentially connected and integrated with the coupling 216, and the crank holders 23 of the respective engine modules 1 and 2 to the base plate, thereby allowing three SRM modules 1-1, 1-2, and 1-3) to rotate one crankshaft 21.

In other words, the engine module with the direction of the crank arm facing is 180° different is additionally combined with the engine of the second embodiment, encoders 3-A3 and 3-B3 for the added engine module are additionally installed on the integrated crankshaft 21, and although not shown, the driver circuit part 41 and the changeover switch 42 for the additionally combined engine module are installed in the controller 4.

Of course, as shown in FIG. 13(a), (b), and (c), only the sensor disk 31 is fixed at a 180° difference, and the sensor 32 is installed in the same radial direction in additionally installed encoders 3-A3 and 3-B3.

As shown in FIG. 13(d), the engine configured in this way is provided with two SRM modules 1-1 and 1-3 applying rotational force at the same time and one SRM module 1-2 applying rotational force at a 90° rotation angle difference.

Fourth Embodiment of the Present Invention

Figure 14:
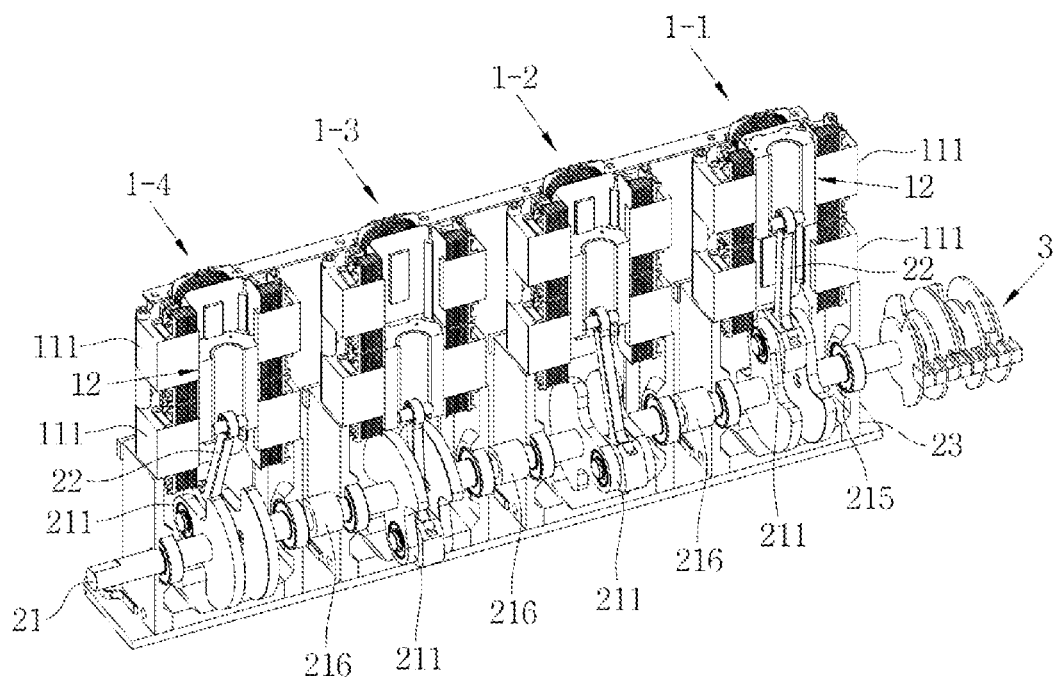
FIG. 14 is a partial cross-sectional perspective view of four SRM modules 1 coupled to the crank mechanism 2 in a reciprocating switched reluctance motor-driven engine according to the fourth embodiment of the present invention.

FIG. 14 is a partial cross-sectional perspective view of four SRM modules 1 (1-1, 1-1, 1-2, 1-4) coupled to the crank mechanism 2 in a reciprocating switched reluctance motor-driven engine according to the fourth embodiment of the present invention.

Figure 15:
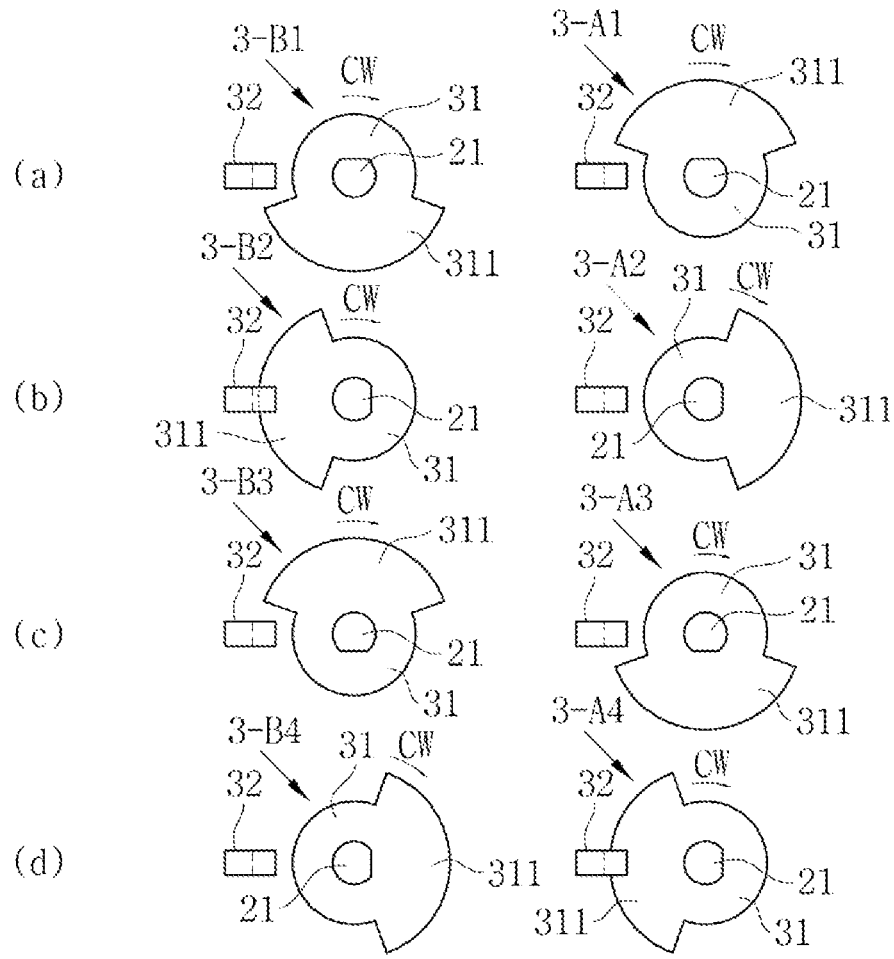
FIG. 15 is (a) a side view showing the axial view of eight encoders 3: 3-A1, 3-B1, 3-A2, and 3-B2 and (b) an excitation time chart schematically showing the excitation time of the two stator cores 111 provided in four SRM modules 1 according to the rotation angle of the crankshaft 21.
Figure 15:
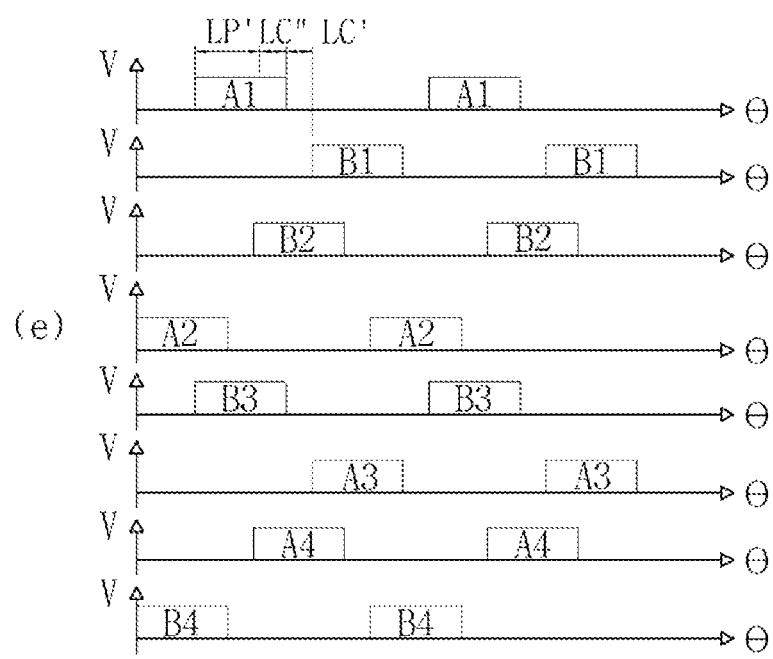

FIG. 15 is (a) a side view showing the axial view of eight encoders 3: 3-A1, 3-B1, 3-A2, and 3-B2 and (b) an excitation time chart schematically showing the excitation time of the two stator cores 111 provided in four SRM modules 1 according to the rotation angle of the crankshaft 21.

The reciprocating switched reluctance motor-driven engine according to the fourth embodiment of the present invention is configured by adding an engine module equipped with a crank arm that is angled 270° different from the crank arm of the standard engine module in the third embodiment. Accordingly, encoders 3-A4 and 3-B4 for the added engine module are additionally installed on the integrated crankshaft 21, and although not shown, the driver circuit unit 41 and a changeover switch 42 for the additionally combined engine module are installed in the controller 4.

That is, as shown in FIG. 14, the integrated crank shaft 21 has crank arms 211 facing 0°, 90°, 180°, and 2700 radial directions, respectively. Further, as shown in FIGS. 15a, 15b, 15c, and 15d, the sensor disks 311 of the added encoder 3-A4 and 3-B4 are equipped with shutter parts 311 in the 2700 radial direction.

In the engine configured in this way, four SRM modules 1-1, 1-2, 1-3, and 1-4 configured to apply rotational force at a 180° rotation angle difference are 0°, 90°, and 1800 apply rotational force at rotation angle differences of 0°, 90°, 180°, and 270°.

Meanwhile, it may be configured to rotate the crankshaft 21 with more than four SRM modules 1, and there may be a plurality of SRM modules 1 with the same direction of the crank arm 211.

In another case, a flywheel may be mounted on the crankshaft 21 to prevent shaking and smooth rotation.

In the above, specific embodiments have been shown and described to illustrate the technical idea of the present invention, but the present invention is not limited to the same configuration and operation as the specific embodiments as above, and various modifications may be made without departing from the scope of the present invention. Accordingly, such modifications should be considered to fall within the scope of the present invention, and the scope of the present invention should be determined by the claims described below.

DESCRIPTION OF REFERENCE NUMBERS

1: SRM (Switched Reluctance Motor) module
11: Stator
111: Stator Core, 1111: Stator Salient Pole
1112: Slot, 1113: Corner
112: Winding Coil, 1121: Bobbin
113: Guide Rail, 1131: Fixing Part
1132: Guide Part, 1133: Coil Catching Part
114: Spacer
115: Long Bolt
12: Mover
121: Mover Core, 1211: Mover Salient Pole
1211a: Salient Pole Opposing Surface, 1211b: Coil Opposing Surface
122: Sliding Block
123: Sleeve, 1231: Piston Pin
1232: Bearing
2: Crank Mechanism
21: Crankshaft, 211: Crank Arm
212: Crank Pin, 213: Bearing
214: Counterweight, 215: Bearing
216: Coupling
22: Connecting Rod
23: Crank Holder
3: Encoder
31: Sensor Disk, 311: Shutter Part
32: Sensor
4: Controller
41: Driver Circuit Part, 42: Changeover Switch
43: Power Unit

The invention claimed is:

1. A reciprocating switched reluctance motor-driven engine comprising:
   an SRM module (1) comprising:
   a cylindrical stator (11) configured to combine two stator cores (111) of which a stator salient pole (1111) excited by a winding coil (112) formed on an inner surface, which are arranged at intervals according to thickness of the winding coil (112) along a central axis direction of the stator core (111) and a piston-shaped mover (12) configured to have a mover salient pole (1211) formed on an outer surface thereof to face the stator salient pole (1111) with an air gap in between and reciprocate along the direction of the central axis of the stator (11) by the force attracted to the excited stator salient pole (1111) when the stator salient pole (1111) of the two stator cores (111) are alternately excited by passing through the stator (11);
   a crank mechanism (2) comprising a crank shaft (21) with a crank arm (211) and a connecting rod (22) configured to connect between the mover (12) and the crank arm (211) to convert the reciprocating movement of the mover (12) into the rotational movement of the crank shaft (21);
   an encoder (3) configured to detect a rotation angle of the crank shaft (21); and
   a controller (4) configured to control the timing for alternately exciting the stator salient poles (1111) of the two stator cores (111) according to the rotation angle detected by the encoder (3).

2. The reciprocating switched reluctance motor-driven engine of claim 1,
   wherein the mover salient pole (1211) is expanded to have a surface (1211b) facing the winding coil (112) with an air gap through which magnetic flux passes.

3. The reciprocating switched reluctance motor-driven engine of claim 1,
   wherein the mover salient pole (1211) is formed to extend in the reciprocating direction longer than the reciprocating movement direction length of the stator salient pole (1111).

4. The reciprocating switched reluctance motor-driven engine of claim 3,
   wherein the reciprocating movement direction length of the stator salient pole (1111) is a length between both ends of the reciprocating direction of the winding coil (112).

5. The reciprocating switched reluctance motor-driven engine of claim 1,
   wherein the mover salient pole (1211) is formed to extend in the reciprocating direction longer than the reciprocating direction length of the stator salient pole (1111) while being formed expanded in the width direction to have a surface (1211b) facing the winding coil 112 with an air gap through which magnetic flux passes.

6. The reciprocating switched reluctance motor-driven engine of claim 1,
   wherein each of the stator cores (111) has an inner surface of a polygonal cross-section, and a slot is formed on each inner surface, leaving the stator salient pole (1111) at the center thereof so that the bobbin (1121) wound around the winding coil (112) is configured to extrapolate to the stator salient pole (1111).

7. The reciprocating switched reluctance motor-driven engine of claim 6,
   wherein the reciprocating movement of the mover (12) is guided by guide rails (113) fixed to the inner corners of the two stator cores (111).

8. The reciprocating switched reluctance motor-driven engine of claim 1,
   wherein the crank arm (211) reaches top dead center when the mover salient pole (1211) is centered on the stator salient pole (1111) of one of the stator cores (111) and reaches bottom dead center when the mover salient pole (1211) is centered on the stator salient pole (1111) of the other of the stator cores (111).

9. The reciprocating switched reluctance motor-driven engine of claim 1,
   wherein two encoders (3) are provided in one-to-one correspondence with the stator cores (111) and comprises a sensor disk (31) having a shutter part (311) with a rotation angle of the crankshaft (21) corresponding to the range of movement of the mover salient pole (1211) such that the stator salient pole (1111) can exert an attractive force to reduce its reluctance with the mover salient pole (1211) and a sensor (32) detecting the rotation angle at which an attractive force can be applied by sensing the shutter part (311) of the sensor disk (31) rotating by the crankshaft (21), and
   wherein the controller (4) excites the stator salient pole (1111) to cause the mover (12) to reciprocate while the two encoder (3) corresponding to the two stator cores (111) senses the shutter part (311).

10. The reciprocating switched reluctance motor-driven engine of claim 9,
    wherein the angle of the shutter part (311) of the sensor disk (31) is set to the rotation range of the crankshaft (21) corresponding to the length of the reciprocating movement direction of the stator salient pole (1111), and
    wherein the controller (4) is capable of rotating the crankshaft (21) forward and backward by exchanging the two encoders (3) used to determine the excitation timing of the two stator salient poles (1111).

11. The reciprocating switched reluctance motor-driven engine of claim 1,
    wherein the crank shaft (21) has a plurality of crank arms (211) each rotatably connected to the connecting rod (22) oriented in different radial directions, and
    wherein a plurality of SRM modules (1) are provided, each connected one-to-one to the crank arm by a connecting rod.

12. The reciprocating switched reluctance motor-driven engine of claim 11,
    having two crank arms (211) facing radial directions with a 90° angle difference among the plurality of crank arms (211).

13. The reciprocating switched reluctance motor-driven engine of claim 11,
    having crank arms (211) facing radial directions with angular differences of 90° and 180°, respectively, relative to one of the plurality of crank arms (211).

14. The reciprocating switched reluctance motor-driven engine of claim 11,
    having crank arms (211) facing radial directions with angular differences of 90°, 180° and 270°, respectively, relative to one of the plurality of crank arms (211).

* * * * *